United States Patent [19]

Hunt

[11] 4,323,186

[45] Apr. 6, 1982

[54] MANUFACTURE OF HIGH PERFORMANCE ALLOY IN ELONGATED FORM

[75] Inventor: James G. Hunt, Terrace Park, Ohio

[73] Assignee: Polymet Corporation, Cincinnati, Ohio

[21] Appl. No.: 178,946

[22] Filed: Aug. 18, 1980

[51] Int. Cl.³ .............................................. B23P 17/00
[52] U.S. Cl. .............................. 228/173 E; 29/419 R; 29/423
[58] Field of Search .................... 29/419 R, 422, 423, 29/424, 527.5, 527.7; 228/173 E

[56] References Cited

U.S. PATENT DOCUMENTS

| | | | |
|---|---|---|---|
| 2,050,298 | 8/1936 | Everett | 29/419 R |
| 3,277,564 | 10/1966 | Webber et al. | 29/419 |
| 3,378,999 | 4/1968 | Roberts et al. | 29/419 X |
| 3,394,213 | 7/1968 | Roberts et al. | 29/419 X |
| 3,540,114 | 11/1970 | Roberts et al. | 29/419 X |
| 4,209,122 | 6/1980 | Hunt | 228/173 E |

Primary Examiner—Ervin M. Combs
Attorney, Agent, or Firm—Edmund S. Lee, III

[57] ABSTRACT

A method is described for obtaining extrusion products of "high performance" alloy wire of small cross section in an economical fashion. The ratio of length to cross section of cast "high performance" alloy preforms limits the length of a filled billet to less than the optimum which may be extruded on available extrusion presses where it is desired to obtain small diameter extrusion products in a single extrusion. This limitation is overcome by squaring the ends of cast lengths of the alloy and then butt welding such lengths to compositely form preforms of the maximum length capable of being extruded on a given extrusion press. The composite preforms are extruded in a filled billet in accordance with the teachings of U.S. Pat. No. 4,209,122. The extrusion products from these composite preforms have the same desirable properties described in that patent and extend the benefits described therein.

5 Claims, 1 Drawing Figure

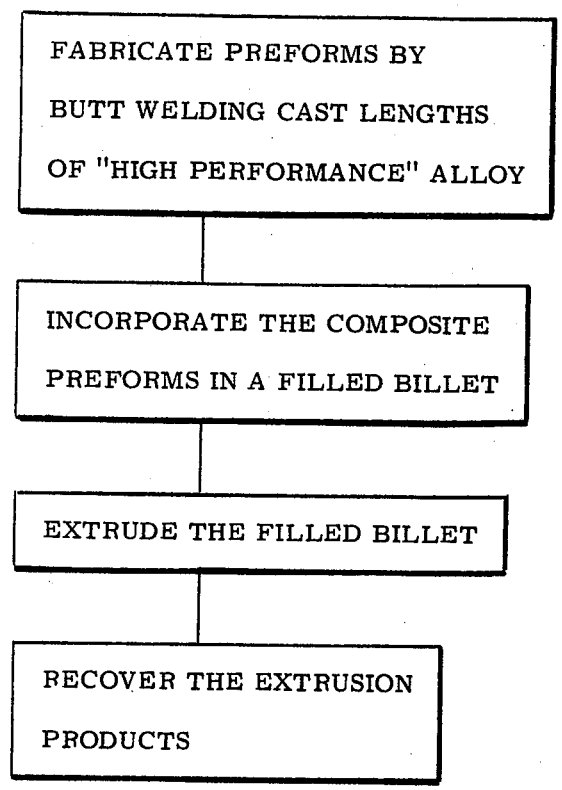

MANUFACTURE OF HIGH PERFORMANCE ALLOY IN ELONGATED FORM

The present invention relates to improvements in the manufacture of "high performance" alloys of extended length and relatively small cross section and more particularly to improved economies in the manufacture of such alloys in wire form.

My recently issued U.S. Pat. No. 4,209,122, of common assignment with the present application, describes an extrusion process for the manufacture of "high performance" alloy wire which finds particular utility in applying hard facings to wear surfaces. As will become apparent, the present invention is an improvement on the teachings in that patent.

Hard facing is a well known technique whereby selected portions of an article are surfaced with a material which has specialized characteristics not found in the base material, and, which, generally speaking, will be a less expensive material than the hard facing. Typically, hard facing is provided to increase the wear life of such items as shears, dies, valves and pulverizing hammers. Such items have surfaces or edges which are subject to extreme abrasion and/or elevated temperatures in their operating environments. By hard facing these edges and surfaces with an appropriately selected "high performance" alloy, wear life can be increased as much as fifty times or more, with a relatively small cost increment for the article so treated.

Application of "high performance" alloys (this term is later defined in detail) as a hard facing is accomplished by their fusion to a base material, or substrate. Several welding processes could be employed for such purpose, but, particularly with "high performance" alloys, gas tungsten arc and atomic hydrogen methods are preferred for reasons well appreciated by those skilled in the art.

Among the requirements for "high performance" wire to be applied to these welding methods is that the diameter of the wire not only be relatively small, but also that its diameter be controlled within close tolerance limits. This latter characteristic is coupled with the further desired requirement that the wire be at least several feet in length where the hard facing is to be applied by automated welding machines in high production facilities.

My referenced, prior invention describes the discovery that, contrary to the teachings found in the prior art, "high performance" rods in an "as cast" condition could be extruded to wire form, employing the filled billet extrusion method and employing defined conditions in the extrusion process. This method has made available, at a practical cost, a wide range of "high performance" alloys for hard surfacing.

In practicing this earlier invention available extrusion presses and their characteristics and limitations, as well as the state of the art in filled billet extrusion control the costs in providing "high performance" alloys in small diameter wire form. Presently presses are available to extrude filled billets of various dimensions, six to nine inches in diameter and 28 to 38 inches in length being typical. They further have a common characteristic that in the extrusion of "high performance" alloy rods, or preforms there is a practical limitation of approximately five times diameter reduction, or 25 times area reduction.

It is also to be noted that operation of an extrusion press becomes progressively more economical as the volume of work product extruded in each cycle increases. Thus, all other things being equal, the costs of extrusion per workpiece would be less in extruding a billet nine inches in diameter and 38 inches in length than for a billet six inches in diameter and 12 inches in length.

It becomes apparent that if the cast preform is of a diameter more than five times than that desired in the extrusion product, then, as taught in my prior patent, at least a second extrusion step is required to obtain the smaller diameter desired. Alternatively, if the cast "high performance" alloy preform is less than five times the diameter of the desired extrusion product, but is of a length less than the maximum length which can be extruded on a given extrusion press, the volume of extrusion product obtainable on each cycle of operation is reduced and the cost per workpiece is increased.

This is exactly the situation faced in the practice of my prior invention. Many hard facing applications require "high performance" wire with a diameter of 0.045 inch, or smaller. In order to obtain such wire with a single extrusion, the cast preform must have a diameter no greater than 0.225 inch. Actually, the more practical maximum diameter for the preform would be 0.180 inch since the common, as opposed to theoretical, diameter reduction employed in the industry is in the order of four times. In any event, present casting technology is such that there are practical limitations on the length to diameter ratio which may be obtained in casting workpieces. The relatively new process of aspiration casting provides workpieces with smoother surfaces than obtainable with sand casting and also enables the castings to have greater length to diameter ratios. Even so, aspiration casting will not enable production of workpieces with a length to diameter ratio much in excess of 80 to one.

To illustrate this further and assuming a diameter reduction of four times, to obtain a wire diameter of 0.045 inch the case preform diameter would be —180 inches. However, the maximum length of a casting with this diameter is 14.4 inches. If a short billet with 14.4 inch long preform is extruded on a press with a capacity for a thirty-eight inch billet, the costs of extrusion would be more than doubled because of the use of the shorter billet length. Alternatively, starting with preforms with a diameter of 0.720 would allow the use of billets of maximum length, but then two extrusions would be required to obtain a final 0.045 inch dimension. The extrusion costs could be even greater than using the shorter billet. Illustrated in another fashion, assuming a diameter reduction of four times, where a press has the capacity to extrude preforms up to 36 inches in length, the minimum wire diameter of the preform would be about 0.45 inches and the minimum wire diameter which could be obtained in a single extrusion would be about 0.113 inches.

The object of the present invention is to overcome the economic limitations on the production of "high performance" alloys in elongated form where small cross sections in the end product are desired.

Another object of the present invention is to make more economical the production of "high performance" alloy wire having diameters in the order of 0.070 inches and smaller.

To attain these ends I have discovered that cast, "high performance" alloy, extrusion preforms may be compositely formed. Thus, where the optimum length for an extrusion preform is greater than can be cast, I form the preform from a plurality of cast lengths of "high performance" alloy, the combined lengths of which exceed the optimum or desired length.

Simply put, the ends of such lengths which would abut when aligned to form the desired preform length, are squared and then welded together to form joints which have a grain microstructure no coaser than that of the "high performance" alloy in its as cast condition.

These compositely formed preforms are then assembled in a filled billet and extruded within the parameters and in accordance with the teachings of my said prior patent. These parameters will not be repeated at this point, but are set forth in later portions of the present application.

The compositely formed preforms have discontinuities, as to their physical properties, along their lengths at the joints thus formed, due to the heat and working of the metal during welding. The unexpected result is that the method employed in their extrusion yields an extrusion product which is homogeneous, throughout its length in all its relevant physical properties. Thus, upon recovery of the extrusion product, the small diameter wire has the same stiffness, strength, ductility, as well as dimensional uniformity in the portions where the joints were made as in the remainder of the extruded wire.

In forming the joints between the cast lengths of "high performance" alloy, it is preferred to follow the known technique of electrical resistance butt welding wherein the resistance of the abutting surfaces of aligned sections of cast alloys creates sufficient heat to melt the metal adjoining these surfaces; then the molten or near molten metal, adjoining these surfaces are axially displaced by mechanical compression, creating an outflow of molten or semi-molten metal in the form of a flash. This flash is then, preferably, removed prior to extrusion.

The above and other related objects and features of the invention will be apparent from a reading of the following specification with reference to the accompanying drawing and the novelty thereof pointed out in the appended claims.

In the drawing:

The single FIGURE is a block diagram of the steps described herein to economically obtain "high performance" alloy wire of small diameters.

Before describing, in detail, the method of practicing the present invention, the term "high performance" alloy will be more fully defined, consistant with the definition found in U.S. Pat. No. 4,202,122. Actually, this term is imprecise as are may similar terms, such as "super alloy", used in the metallurgical field. Basically though, "high performance" alloys include those alloys which comprise a moderate percentage of carbides and/or borides in addition to other constituents which provide a high degree of hardness and/or abrasion resistance and, usually, the further capability of maintaining these properties at elevated temperatures. Such alloys are also characterized by being essentially unworkable at ordinary room temperatures because of their brittleness in addition to their hardness and abrasion resistance properties. Difficulties in the workability of such "high performance" alloys may also be attributed to the faults found in their castings, such as "hot tears" and "centerline shrink".

Metallurgically, and in a narrower sense, "high performance" alloys are characterized by a plurality of constituents of which nickel, chromium, or cobalt or a combination of these elements, generally constitute the major portion of the alloy. More particularly such alloys are characterized by a hardening mechanism which gives them the desirable properties of abrasion resistance and hardness, and the ability to maintain such properties at elevated temperatures. Such hardening mechanisms likewise cause the "high performance" alloys to be brittle and essentially unworkable at ordinary room temperatures. Typically, the hardening mechanisms are provided by intermetallic compounds in various complex phase relationships. The pressure of transition metal carbides and borides are representative of the hardening mechanisms employed. Additionally such alloys will include one or more elements from the group consisting of tungsten, molybenum, manganese, silicon, iron and vanadium. Alloys of such composition and characteristics, and their equivalents are broadly included within the term "high performance" alloys as employed herein.

In a more specific sense, the term "high performance" alloy is limited to nickel and cobalt based alloys of such carbon content, with or without boron, which are exemplified by the alloy compositions set forth in Groups 4A, 4B and 4C of Table 2, Metals Handbook, Volume 6, Eighth Edition, (1971), American Society for Metals, Metals Park, Ohio 44073, at page 155. These alloys are specifically identified as being particularly suited for use in hard facing.

The following table lists commercially available compositions of the above identified hard facing alloys:

| | | | NOMINAL CHEMICAL COMPOSITION (Weight percent) | | | | | | | | |
|---|---|---|---|---|---|---|---|---|---|---|---|
| Cr | Ni | Co | C | B | FE | Si | W | Mo | Mn | V | NAME |
| 30.0 | | Bal. | 2.5 | | | | 12.0 | | | | Stellite 1* |
| 28.0 | | " | 1.1 | | | | 4.0 | | | | Stellite 6* |
| 29.0 | | " | 1.3 | | | | 8.0 | | | | Stellite 12* |
| 27.0 | 2.8 | " | .25 | | | | | 5.0 | | | Stellite 21* |
| 8.2 | # | " | .08 | | # | 2.6 | | 27.5 | 1.0 | | Tribaloy 400** |
| 17.0 | # | " | .08 | | # | 3.3 | | 27.5 | 1.0 | | Tribaloy 800** |
| 27.0 | 5.0 | " | .85 | .05 | | .5 | 1.0 | 19.0 | | .01 | 1.1 | PWA 694* |
| 15.0 | Bal. | | .40 | 3.5 | 4.0 | 4.0 | | | | | Stellite 40* |
| 12.0 | Bal. | | .35 | 2.5 | 3.0 | 3.5 | | | | | Stellite 41* |

Combined Nickel and Iron Total 3.0
*Stellite Division of Cabot Corp. Kokomo, Indiana
**Arcos Corp. Philadelphia, Pennsylvania From the foregoing it will be apparent to those skilled in the art that the term "high performance" alloys defines a class of materials which is further characterized as being, economically incapable of being converted directly from a cast form to a wire form, particularly a wire form which would be suitable for hard facing deposition, as above discussed.

Further recapitulating the teachings of my prior patent, rods cast from a given "high performance" alloy are incorporated in a filled billet. Thus, a plurality of cast rods are assembled in parallel, spaced relationship inside of a tube, or can, which is closed at its opposite ends, after the interior has been filled with filler material. This billet is then extruded in an extrusion press to effect a simultaneous reduction in the diameters of the several cast rods, or preforms. After extrusion, the ends of the extruded billet are cropped off and the remaining extrusion products are recovered by mechanical and/or chemical means.

The predicate of my prior invention was the discovery, contrary to the teaching of persons skilled in the art, that the extrusion products thus obtained possessed the characteristics of a smooth, uniform wrought product, all as is more fully set forth in said patent.

The present invention follows the teachings of this earlier invention in all particulars excepting that the rods or preforms that are incorporated in to the filled billet are compositely formed of one or more lengths of cast "high performance" alloy.

As a preliminary step, the maximum length of preform capable of being extruded in a given extrusion press would first be determined, as well as the desired diameter of the extrusion product. From the latter parameter and the diameter reduction to be obtained in the extrusion process, the initial diameter of the cast preforms is readily ascertained.

Having made these determinations "high performance" alloy castings of the desire diameters for the preform are selected to compositely form the several preforms which are to be incorporated into the filled billet. Preferably the lengths of these initial castings are selected so that they are slightly more than an even fraction of the desired preform length, that is one half or one third, etc. This reduces the length to diameter ratio of the castings, thus minimizing the proportion of casting rejects which tends to increase when castings are made at the maximum length to diameter ratio. It also minimizes the amount of scrap and processing required to obtain the preforms employed herein.

All of this is best illustrated by specific figures. Assuming that the desisred diameter of the extrusion product is 0.045 inch and that the diameter reduction is to be four times, the preform diameter would be 0.180 inch and the maximum length of casting (by the aspiration method) would be about 14.4 inches. If the extrusion press is capable of extruding billets incorporating 36 inches, the length of the "high performance" alloy castings would be somewhat greater that twelve inches, 12.25 inches.

Continuing the above assumptions, each of the three castings are then squared at their opposite ends to a length more precisely controlled to a dimension slightly in excess of twelve inches. This is most readily done with an abrasive cutting disc. After the squaring, the lengths of alloy are washed to remove any abrasive.

The three castings, with their ends thus squared are joined together to compositely form one of the preforms which is to be incorporated into the filled billet. Joining of these cast lengths is done by welding and preferably by the known technique of electrical resistance welding wherein the lengths are aligned and connected across a source of electrical potential with their ends abutting. The resistance of the surface contact between the workpieces generates sufficient heat to melt the metal at this point and then while this molten, or semimolten condition exists, the workpieces are moved axially together, forming a reliable weld joint.

The electrical resistance butt welding method thus referenced is well known and machines are commercially available for welding lengths of cast "high performance" alloys. While the details of the welding process form no part of the present invention, nonetheless, such process is preferred herein for the reason that it forms a weld joint which is free of occlusion and which by controlled cooling has a grain structure no coarser than that of the castings. Actually air cooling will generally suffice.

While there are advantages in squaring off both ends of each length of cast alloy compositely forming a preform, it is only necessary that ends which are to be joined be so squared. Thus, for example, if a preform is to be formed from only two castings, only one end of each casting need be squared.

Also, the above description assumes a relatively high production rate where it is economical to establish the controls necessary to obtain castings whose lengths are within a relatively close tolerance. In small lots aspiration casting does not necessarily yield cast lengths of such closely controlled lengths and it may well be necessary to "mix-n-match" different casting lengths to obtain the desired preform length. Thus, for small scale production, the location of the weld joint in a lengthwise direction may well vary.

An inherent characteristic of an electrical butt weld is that there is an outward flash of the metal at the weld joint. This flash is removed, by grinding as the final step in compositely forming the preforms. There may also be some tendency for the diameter of the weld joint to otherwise increase due to the application of an axial pressure, and, when present, any other increase in diameter at the weld joint. The weld joint is thus "benched" so that its diameter is within the dimensional tolerance of the cast lengths of "high performance" alloy.

These compositely formed preforms are then assembled in a cage which positions them in closely spaced, parallel relationship. The cage is positioned in a can having a cap secured to one end and the interior then filled with filler material.

Consistent with my referenced, prior teachings, particulate or powdered filler material is introduced into the can and agitated, or otherwise settled to a relative density of at least 0.33 and preferably at least 0.45. Further the filler material is characterized, when compacted, by an extrusion constant which, optimally approximates that of the preforms and in any event is no more than 40% greater or less than the extrusion constant of the preforms, and preferably is within 25% of the extrusion constant of the preforms.

Extrusion constants are readily determined by the known relationship of $k=P/\ln R$, wherein k is the extrusion constant expressed in tons/inch$^2$; and lnR is the natural logarithm of the reduction ratio, i.e., the ratio of the cross sectional area before extrusion to the cross sectional area after extrusion. It will also be noted that extrusion constants generally tend to decrease with increasing temperatures and the filler material should be selected with this factor in mind.

Additionally the filler material should, preferably, be chemically inert with respect to the alloy of the preforms and subject to selective acid attack to facilitate recovery of the extrusion products as will later appear.

Powdered metals with a particle size under 0.005 inch are particularly suitable as filler material, Monel (70% Ni–30% Cu) is a preferred filler material although iron and low carbon steel powders may be employed where the cost is a more predominent consideration.

The remaining components of the billet may be formed of low carbon steel, with the billet being completed by a cap secured to the other end of the can after introduction of the filler material.

Extrusion of the filled billet is done on an extrusion press of conventional design following the parameters to be set forth.

Preliminary to extrusion, the filled billet is heated to the extrusion temperature for the specific "high performance" alloy constituting the preforms. Extrusion temperature is generally equated with the forging temperature of the "high performance" alloy. It is empirically determined and comprises a temperature range as opposed to a finite temperature. The filled billet is soaked at this temperature for a period of time sufficient for all portions of the billet to be evenly heated. Usually a matter of hours are required to eliminate temperature gradients.

The preheated billet is introduced into the liner of an extrusion press and then extruded through a conical die which is sized to provide the desired diameter reduction. Operation of such presses is well known, however, certain operating conditions are to be observed. The area reduction should be within the broad range of 3 and 45 times and more preferably within the narrower range of 5 and 35 times. Note the diameter reduction is the square root of area reduction. The extrusion rate is then maintained within the broad range of 50 to 250 inches per minute and more preferably within the narrower range of 75 to 125 inches per minute.

After extrusion the ends of the billet are cropped, usually about 10% from each end, to remove the portions of the extrusion products which become distorted as a normal incident of the extrusion process. The remainder of the extruded wires are then recovered from the cropped billet. One common procedure is to machine off the can and then place it in a 50% nitric acid bath to eay away the filler material and enable recovery of the extruded lengths of "high performance" alloy wire.

The steps set forth above which constitute the present invention are summarized in the block diagram of the single FIGURE in the drawing.

The wire thus obtained possesses the same desirable characteristics as wire produced from a preform comprising a single casting in accordance with the teachings of my prior U.S. Pat. No. 4,209,122, including a freedom from voids and surface discontinuities as well as being much more flexible and less brittle than the preform material in its as cast condition. As previously obtained, the extrusion products from composite preforms typically have a diameter variation of about ±0.005 inch and are capable of being cold drawn to a tolerance of ±0.001 inch or less.

The truly unexpected characteristic of the wire produced by the present invention is that it is homogeneous throughout its length. This is to say that despite the fact that, at the weld joints of the preforms, the grain structure was distinctly different due to the alloy being melted and then being worked, the described extrusion method converted both the main portions of the preforms and the joint portions into an end product which had uniform characteristics, i.e., stiffness, ductility, strength and dimensional uniformity in both of these areas.

Also, again as in my prior invention, the primary thrust of the present invention and its narrower aspects are limited to the production of "high performance" alloy wire of circular cross section for use in hard surfacing applications it will be apparent to those skilled in the art that the broader aspects of the invention will enable economies generally in the production of "high performance" alloy extrusion products where the length of the cast preform is less than the maximum length of preforms which can be accomodated in a given extrusion press. The scope and spirit of the present invention is, therefore, to be derived from the following claims.

Having thus described the invention, what is claimed as novel and desired to be secured by Letters Patent of the United States is:

1. A method of manufacturing wire and other components having a high length to cross section ratio, comprising the steps of fabricating "high performance" alloy, extrusion preforms of a length greater than can be obtained by casting the "high performance" alloy, said fabricating step including the steps of (a) selecting at least two lengths of "high performance" alloy in an "as cast" condition, the combined lengths of which are greater than the desired length of the preform, (b) squaring the ends of such lengths of "high performance" alloy which would abut when they are aligned to form a preform of the desired length, (c) welding such abutting ends to form joints between said lengths having a microstructure no coarser than the microstructure of the "as cast" lengths, positioning a plurality of these composite preforms into a can in parallel relation with each other and parallel to the axis of the can, closing off one end of said can with a cap, introducing powdered filler material into said can to fill the spaces between said composite preforms and between the preforms and the interior surface of said can, said filler material being generally spherical with a diameter of less than 0.010 inch, said filler material being further characterized by an extrusion constant within approximately 40% of the extrusion constant of said rods, compacting said filler material to a relative density of at least 0.33, attaching a cap to the other end of said can to thus complete a filled billet in which the preforms are incorporated, heating said filled billet to a temperature approximating the forging temperature of said preforms for a period of time sufficient for all portions of the billet to reach such temperature, placing said preheated, filled billet in an extrusion press and extruding said billet at a pressure between approximately 30 and 120 tons/inch$^2$ at a rate between about 50 and 250 inches per minute through a die affecting an area reduction in the cross section between 3 and 45 times, allowing the extruded filled billet to cool, and removing the extruded "high performance" alloy preforms from the can and filler material.

2. A method of manufacturing wire and other components having a length to cross section ratio as in claim 1 wherein the steps of welding abutting ends of the cast lengths of "high performance" alloy is accomplished by electrical resistance butt welding and the step of fabricating preforms further includes "benching" the weld joints to bring their dimensions within the cross sectional tolerance limits of the cast lengths of "high performance" alloy.

3. A method of manufacturing wire and other components having a high length to cross section ratio as in claim 2 wherein,
the length of each cast length of "high performance" alloy is somewhat greater than an even fraction of the overall length of the preform to be fabricated.

4. A method of manufacturing wire and other components having a high length to cross section ratio at in claim 3 wherein
each length of cast "high performance" alloy is squared at its opposite ends to a length closely approximating said even fraction by abrasive sawing and then the lengths thus squared are washed to remove any abrasive grit or other contamination prior to such lengths being welded.

5. A method of manufacturing wire and other components having a high length to cross section ratio as in claim 2 wherein
the "high performance" alloy is selected from the group consisting of cobalt-base and nickel-base alloys having a content ranging between 1.00% and 4.00% of the group comprising carbon and boron,
the area reduction is between 5 and 35 times, and
the extrusion rate is between 25 and 125 inches per minute.

* * * * *